(12) United States Patent
Tuohino et al.

(10) Patent No.: US 7,027,433 B2
(45) Date of Patent: Apr. 11, 2006

(54) ROUTING A CALL BETWEEN DIFFERENT TYPES OF NETWORKS

(75) Inventors: Markku Tuohino, Espoo (FI); Jukka P. Hänninen, Helsinki (FI)

(73) Assignee: Nokia Corporation, Espoo (FI)

( * ) Notice: Subject to any disclaimer, the term of this patent is extended or adjusted under 35 U.S.C. 154(b) by 873 days.

(21) Appl. No.: 09/885,636

(22) Filed: Jun. 20, 2001

(65) Prior Publication Data

US 2002/0196775 A1 Dec. 26, 2002

(51) Int. Cl.
*H04L 12/66* (2006.01)

(52) U.S. Cl. .............. 370/352; 370/401; 370/466; 455/422.1; 455/445

(58) Field of Classification Search ........ 370/352–356, 370/401, 466, 400, 349, 338, 328, 313; 455/433, 455/445, 422.1
See application file for complete search history.

(56) References Cited

U.S. PATENT DOCUMENTS

| 5,878,347 | A  | * | 3/1999  | Joensuu et al. ............. 455/433 |
| 5,901,352 | A  |   | 5/1999  | St-Pierre et al. |
| 6,222,829 | B1 |   | 4/2001  | Karlsson et al. |
| 6,240,293 | B1 |   | 5/2001  | Koster ........................ 455/445 |
| 6,314,284 | B1 |   | 11/2001 | Patel et al. |
| 6,560,457 | B1 | * | 5/2003  | Silver et al. ................ 455/445 |
| 6,795,444 | B1 | * | 9/2004  | Vo et al. ..................... 370/401 |
| 2002/0169883 | A1 | * | 11/2002 | Bright et al. ............... 709/230 |
| 2003/0081754 | A1 | * | 5/2003  | Esparza et al. ........ 379/221.01 |
| 2004/0137900 | A1 | * | 7/2004  | Varonen et al. ............ 455/433 |

FOREIGN PATENT DOCUMENTS

| WO | WO 01/03446 | | 1/2001 |
| WO | WO 03/034770 | * | 4/2003 |

* cited by examiner

*Primary Examiner*—Ricky Ngo
*Assistant Examiner*—Nittaya Juntima
(74) *Attorney, Agent, or Firm*—Lackenbach Siegel, LLP

(57) ABSTRACT

The basic idea is to enhance functionality of the Signaling Relay Function for support of MNP (MNP-SRF) so that the normal HLR query in the circuit switched domain is bypassed and the call is routed to an IMS domain. The SLRF, upon receipt from a GMSC a SRI message containing the real MSISDN number of the called party, translates the MSISDN number to a new MSISDN number and responds to the query by sending a message containing routing information to the IMS domain and the new MSISDN number. Alternatively, the original MSISDN number is used in the response message but a certain identifier is then added into the message. Then the called subscriber is first tried to reach in the IMS domain where the subscriber is likely residing. In case the subscriber yet resides in the circuit switched domain the call is routed from the IMS domain back to the circuit switched domain and not until then the normal HRL query is performed.

31 Claims, 3 Drawing Sheets

Description:
1. IAM (E164)
2. SRI (E164)
3. SRI_ack (E164+RSI)MS-B
4. IAM (E164+RSI)
5. IAM (E164+RSI')
6. SRI (E164+RSI')
7. SRI (E164)
8.. SRI_ack(MSRN)
9. IAM (MSRN)

Abreviations:
E.164 number =    Mobile Station ISDN number (MSISDN r
RSI   =   Routing and Status Information to IMS
RSI'  =   Routing and Status Information to CS
IMS   =   Internet Multimedia Subsystem Fig. 1  *prior art*

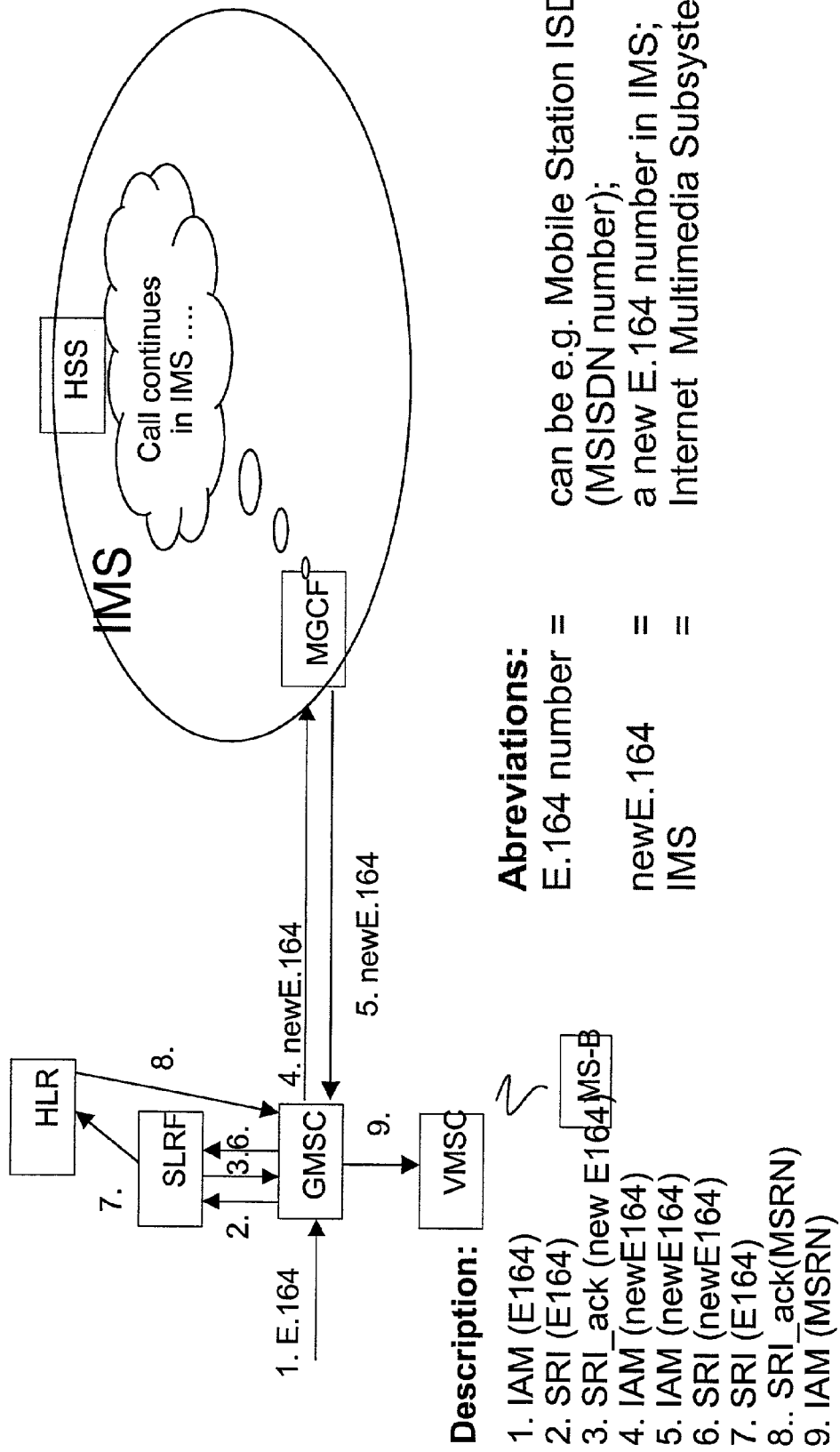

ROUTING A CALL BETWEEN DIFFERENT TYPES OF NETWORKS

FIELD OF THE INVENTION

The present invention generally relates to call routing, and especially to routing a call originating from a circuit switched network and terminating to a packet switched network.

BACKGROUND OF THE INVENTION

Mobile telecommunication networks can be divided into circuit switched networks and packet switched networks. In circuit switched networks, a circuit for communication is allocated prior to the beginning of the transmission. An example of such kind of a network is the GSM network (Global System for Mobile Communications). In this application circuit switched networks are denoted as CS networks.

In GSM a mobile services switching center an MSC is connected not only to other mobile services switching centers of the operator's network but also through a gateway mobile services switching center GMSC to other networks, such as a public telephone network PSTN, another public land mobile network PLMN or an ISDN network. Subscriber information of a mobile station MS is stored permanently in the Home Location Register HLR and temporarily in that Visitor Location Register VLR in the area of which the mobile station MS is located at each time. Thus, for each mobile terminal the home location register HLR stores the MSISDN number of the terminal, IMSI (International Mobile Subscriber Identity), and routing information to that visitor location register VLR that knows location of the mobile terminal at that moment. In other words, mobile station's location information stored in the registers of the mobile communications system is used in routing of calls. Based on location information available from the home location register HLR and from the visitor location register VLR, the incoming call can be routed to that mobile services switching center MSC in the area of which the mobile terminal of the called subscriber is located. Normally the call is routed to a GMSC in the called subscriber's home network. The GMSC sends, using the MAP protocol, an inquiry to the HLR. The HLR asks visitor location register VLR under which the called subscriber is currently located for information on the called subscriber for setting up the call. The visitor location register VLR gives the required information about the mobile station MS, including routing information identifying MSC where the called subscriber is located. That routing information is called Mobile Station Roaming Number MSRN.

The HLR responds with a message containing the MRSN to the gateway mobile services switching center GMSC. The GMSC sends an initial address message IAM towards the MSC, identified by the MSRN, under which the called subscriber is currently located.

It is common to all circuit switched networks that they use E164 numbering system, i.e. MSISDN numbers are shared between operators, each operator holding its own range of MSISDN numbers.

A new packet switched network enabling operators of mobile telecommunications networks to offer their subscribers multimedia services based on and built upon Internet applications, services and protocols is being standardized in 3GPP ($3^{rd}$ Generation Partnership Project). This network is called IP Multimedia Subsystem (IMS). The more detailed implementation of IMS network is beyond the scope of this application and is therefore not discussed in detail. Reference is given to the 3GPP specification documents for a reader is interested to have more information about this topic.

I general IMS should enable the convergence of, and access to, voice, video, messaging, data and web-based technologies for the wireless user, and combine the growth of the Internet with the growth in mobile communications. IMS is a packet switched system where in addition to E.164 number mobile terminals can have a logical name (e.g. SIP URL as defined in RFC2543 and RFC2396).

The core network part of IMS network is called IP Multimedia CN subsystem (IM CN SS) and it comprises all core network elements for provision of multimedia services. This includes the collection of signaling and bearer related network elements. The element of IMS network that is most relevant to this invention is Media Gateway Control function (MGCF). Media Gateway Control function is responsible for the inter-working with circuit switched networks such as PSTN. Again the actual implementation of MGCF is irrelevant. In the viewpoint the invention presented here it is sufficient that the packet switched network has an entity or entities that are capable of receiving signaling form and sending signaling to circuit switched network.

IP multimedia services are based on an IETF defined session control capability that, along with multimedia bearers, utilizes the packet switched domain. In order to achieve access independence and to maintain interoperation with fixed terminals across the Internet, the IP Multimedia Subsystem attempts to be conformant to IETF "Internet standards." Therefore the interfaces conform to Internets standards when an IETF protocol has been selected. The most used protocol is SIP (Session Initiation Protocol).

Usually different MSISDN number ranges are allocated to the different operators. For example the subscribers in the operator A's network have they MSISDN number in a different range that subscribers from the network of operator B. However, arrangements have been made for offering subscribers having an MSIDN number to port the number to another networks. Mobile Number Portability (MNP) is the ability for a UMTS or GSM mobile subscriber to change the subscription network within a portability domain whilst retaining the original MSISDN.

In order to enable the mobile number portability it has been developed a function called Signaling Relay Function for support of MNP (abbreviation is MNP-SRF). In a PLMN that supports mobile number portability, messages sent to an HLR may be relayed by said function MNP-SRF. Depending on the implemented solution, on the type of message (call-related or non-call-related) and on the porting status of the called subscriber, the MNP-SRF may modify the called party address and route the message to a different HLR or to the subscription network or respond with routing information identifying the called subscriber's subscription network.

FIG. 1 illustrates the role of signaling relay function MNP-SRF for support of MNP. A user of mobile terminal $MS_A$ in CS network A wants to call subscriber B whose MSISDN number is held by an operator of CS network B but who is at the moment subscribed to network C. Mobile terminal $MS_A$ originates a call to the recipients MSISDN. Mobile switching center sends an IAM message containing the recipients MSISDNB number to gateway $MSC_A$ of the CS network A. The MSISDN number tells the number range holder network of $MS_B$ wherein $GMSC_A$ sends a message to $GMSC_B$ in the recipient's number range holder network B, phase 1. $GMSC_B$ requests routing information by sending a SRI message (Send Routing Info) to $MNP\text{-}SRF_B$, phase 2. The SRI message contains the recipients MSISDN-number. When $MNP\text{-}SRF_B$ has received the message, it analyses it, makes a database inquiry and identifies the MSISDN being ported into network C. $MNP\text{-}SRF_B$ has in the database knowledge about all its MSISDN numbers that have ported to other networks and also routing information to said networks.

$MNP\text{-}SRF_B$ returns to $GMSC_B$ a message including routing information towards network C and $MSISDN_B$, phase 3. Now gateway mobile switching center B sends IAM message including routing info and the MSISDN number to $GMSC_C$ of network C, phase 4. The $GMSC_C$ requests routing information by sending a SRI message to the $MNP\text{-}SRF_C$, phase 5. The SRI message contains the recipient's MSISDN number, the routing information received from the $GMSC_B$ is not provided to the MNP-SRF. When $MNP\text{-}SRF_C$ has received the message, it analyses it, makes a database inquiry and identifies the MSISDN being ported into network C. $MNP\text{-}SRF_C$ has in the database knowledge about all other network's MSISDN numbers that have ported to network C and also routing information towards the correct HLR in network C. The $MNP\text{-}SRF_C$ modifies the called party address of the SRI to point towards the correct HLR and routes the message towards the HLR, phase 6. The HLR requests MSRN from the VLR and responds with a message containing the MSRN to the GMSC, phase 7. After that the call is routed through MSC to mobile terminal $MS_B$.

In the example above all the networks are circuit switched networks (CS). The situation is, however, different when the PS and CS domains coexist and there are subscribers having access to services of both domains. If a subscriber has subscriptions in both CS and PS domains then it is possible than the same E.164 number can be used for PS sessions like IP multimedia session and CS speech telephony. This allows subscribers who originally had an E.164 MSISDN number to retain the same number for receiving communications in the IMS domain and also in the CS domain when outside IM coverage.

If the subscriber has chosen to keep his CS MSISDN number even when he has a new PS subscription then the call directed to this number are directed to the CS domain. This is due that the MSISDN number is at the range of the CS operator. So when a person is called to this number a CS originated call will be normally routed to the home location register HLR of the CS home network in order to reach the mobile subscriber. This can be for example due there is no MS roaming number (MSRN), like in the IMS network. MSRN is used in the GSM for routing the call to the roaming subscriber in the visited MSC (VMSC).

This kind of routing is not a problem if the subscriber prefers CS domain to PS domain. It is however quite probable that when packet switched networks start rolling out that subscribers start to prefer those. Then the above mentioned prior art type routing because the basic assumption is wrong. If the subscriber spends say 90% of his time using PS connection then 90% of the calls directed to him are first tried to be routed via the HLR. This is clearly not an optimum way of using signaling resources.

SUMMARY OF THE INVENTION

The basic idea of the present invention is to devise a new functionality operating so that the normal HLR query in the circuit switched domain is bypassed and the call is routed to the IMS domain. This new functionality is named in this application Subscriber Locator and Rerouting function (SLRF).

According to the invention, upon receipt from a GMSC a SRI message containing the E.164 number, i.e. the MSISDN number of the called party, the SLRF omits the HLR query but responds to the query sent by the GMSC by SRI_ack message. This message comprises information to be used in the routing decisions. When detecting the routing information the GMSC knows that a routing message shall be sent to the packet switched network.

According to the first embodiment of the invention, an identifier (RSI) is used routing and status information may consist of a certain prefix, a routing number, or like, and the original E.164 number.

According to the second embodiment of the invention, upon receipt from a GMSC a SRI message containing the MSISDN number of the called party the Subscriber Locator and Rerouting function (SLRF) changes the MSISDN number. Then it responds to the query sent by the GMSC by sending a message containing routing information to the IMS domain and the modified MSISDN number. This embodiment is applicable if the called subscriber has one E.164 number in the CS domain but another number in the IMS domain, for example.

Thus, a called subscriber is first tried to be reached in the IMS domain where the subscriber is likely residing but if the subscriber has not been registered there, the call is returned back to the CS domain. Where the GMSC knows on the basis of the information provided by the PS network that the call should be routed in CS domain.

The proposed new functionality can be preferably incorporated into the existing Signaling Relay Function for support of MNP (MNP-SRF). The current HLR functionality remains untouched.

The invention gives a possibility to provide the IMS preferred service to a subscriber who has ported from the CS domain to the IMS domain and also gives possibility to reach the subscriber in the CS domain as a roaming subscriber.

BRIEF DESCRIPTION OF THE DRAWINGS

The invention is described more closely with reference to the accompanying drawings, in which

FIG. 3 illustrates routing steps according to the second embodiment of the invention, and

DETAILED DESCRIPTION OF THE FIRST EMBODIMENT OF THE INVENTION

The first embodiment of the invention is most relevant in situations where the user has same E164 number for both in PS and CS domains.

Figure 1:
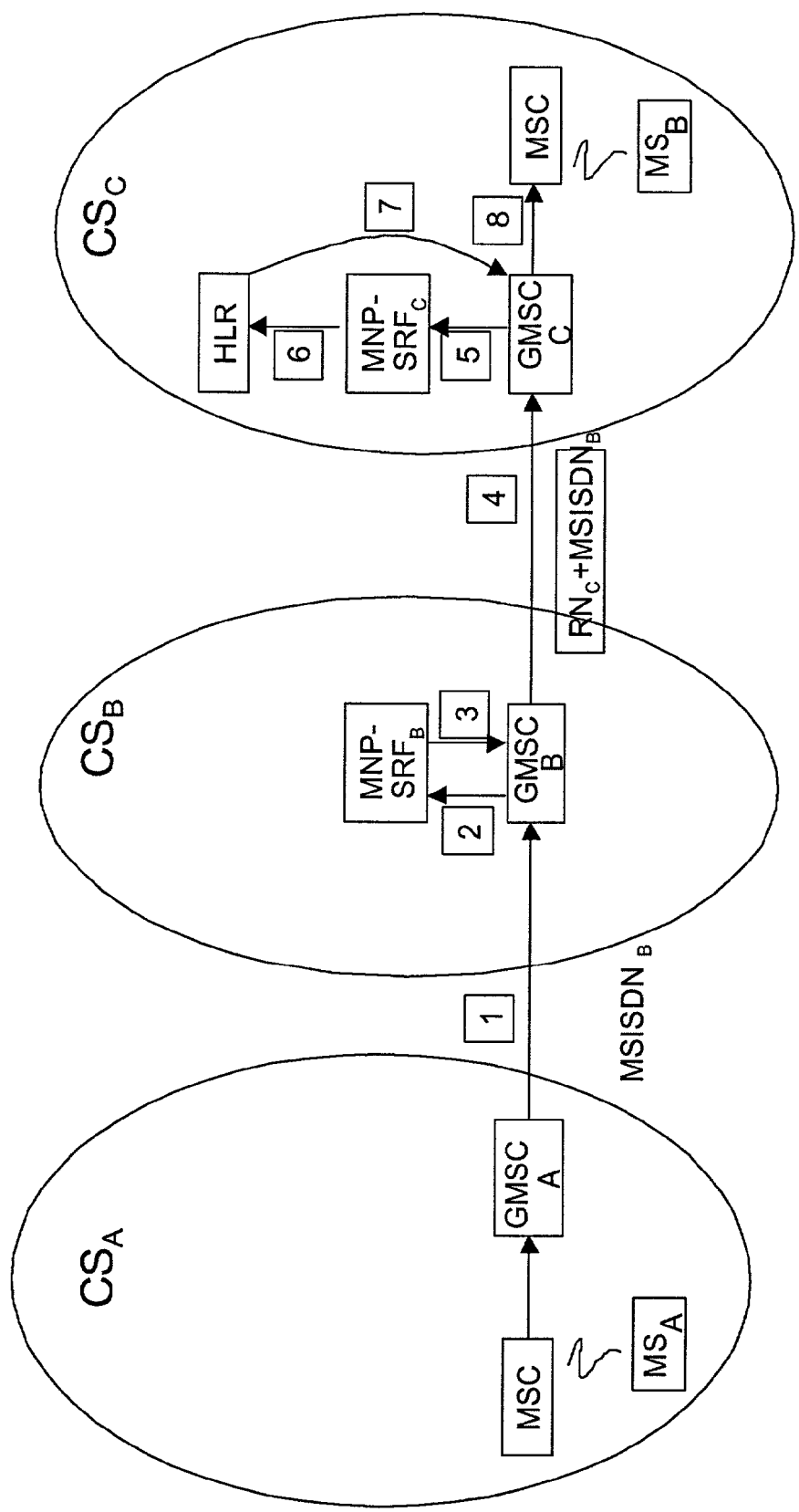
FIG. 1 illustrates the role of signaling relay function MNP-SRF for support of MNP.
Figure 2:
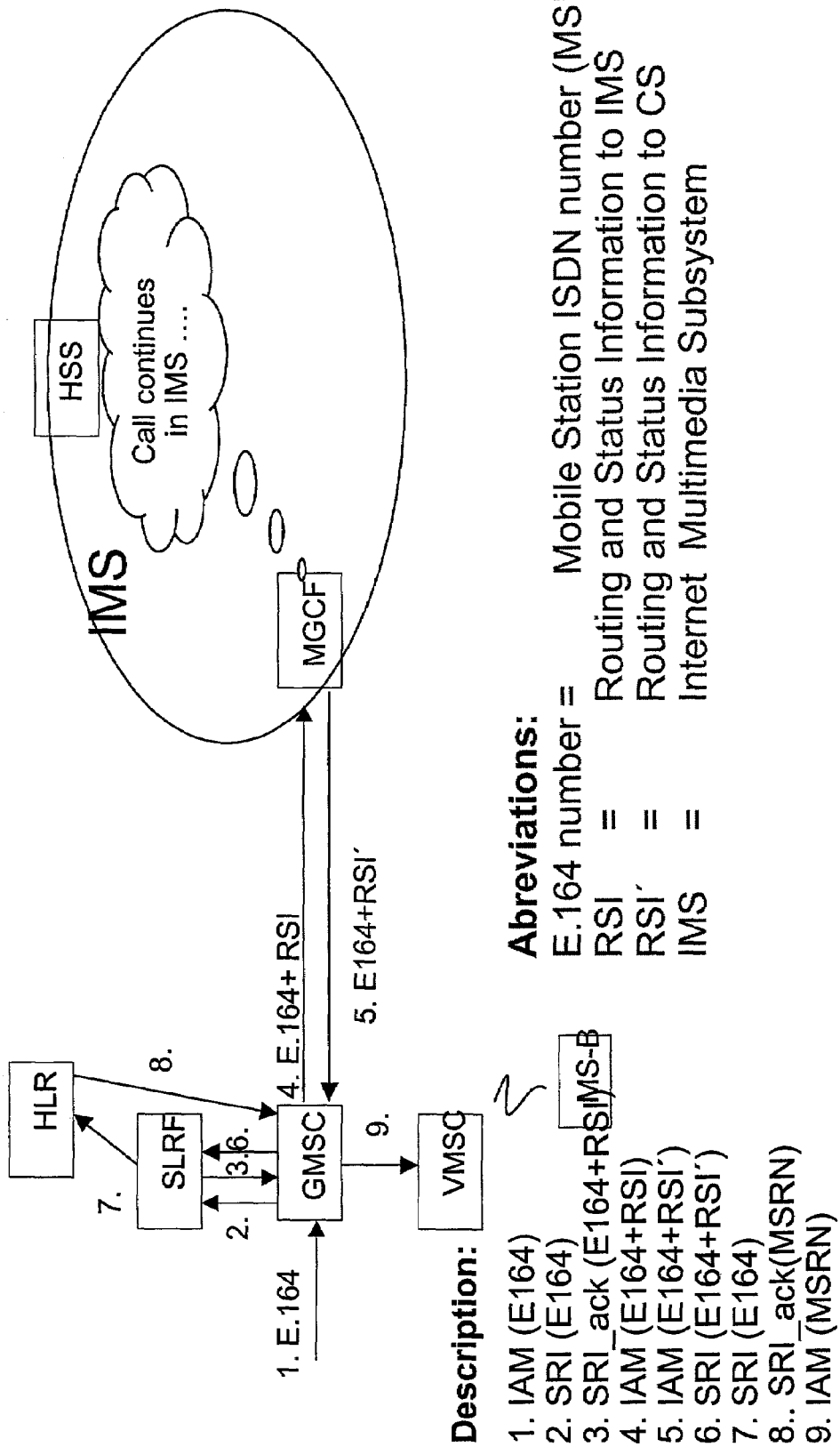
FIG. 2 illustrates routing steps according to the first embodiment of the invention.

FIG. 2 depicts signaling messages when routing a call from PSTN network to a mobile subscriber. The calling party dials the MSISDN number (E.164 number) of the called party. The exchange that received dialing in PSTN detects that the number belongs to a mobile subscriber and finds out from the number the home network of the called party. Then the exchange sends a message to that network which is a circuit switched network, in this example a GSM network. According the prior art this message could be for example an IAM message (Initial Address Message) according to ISUP protocol and contains the MSISDN (i.e. E.164) number of the called party, phase 1 in FIG. 2.

The message arrives to a gateway mobile switching center (GMSC) of the GSM network. This network supports mobile number portability (MNP) wherein subscribers having an MSIDN number held by that network can port their numbers to another networks.

According to the prior art proceedings, the GMSC would inquire routing information by sending via a signaling network a SRI message (Send Routing Information) to the Signaling Relay Function for support of MNP (MNP-SRF) that should relay the SRI message to the HLR. In this invention the GMSC inquires routing information by sending via the signaling network the SRI message to the Subscriber Locator and Rerouting function (SLRF) in order to reach the mobile subscriber in the CS domain, phase 2. The SRI message is preferably comprised of a destination identifier of the called party in E.164 type format. So phase 2 of the invention differs with that of the prior art in that the SRI message is sent to the SLRF, not to the MNP-SRF. This is of course just a naming issue, in practice MNP-SRF and SLRF might even be in the same element.

The signaling protocol used is preferably MAP (Mobile Application Part) but the signaling network may be any signaling network used in the art. In the prior art preference is normally given to the CS domain and its services. But as it is very likely that in the future the called party would prefer using packet switched network and its services, if he has subscribed also to the IMS network, but still retains his/her E.164 number of the CS network, in this case the MSISDN number. To eliminate the probably unnecessary HLR query the SLRF may have actual knowledge that the called party is subscribed to the IMS. Even as the SLRF has the knowledge that the user has subscribed also in PS network, it doesn't necessarily have knowledge of the current status of the subscriber. That is, the SLRF knows that the subscriber could be either in CS or in PS domain, but it doesn't know where the subscriber currently is.

In this invention it is assumed that the subscriber is most probably roaming in PS network and therefore the call is first routed there. Therefore Subscriber Locator and Rerouting function (SLRF) responds to GMSC by sending a SRI-Ack message to GMSC, phase 3. The SRI-Ack message contains routing information that is used to rout the call towards PS domain. This routing information preferably contains the MSISDN number of the called party and routing and status information (RSI). RSI can be a certain for example a certain prefix, any tag or an E.164 number.

The routing status information tells GMSC that a routing message shall be sent to the IMS domain where the called party is supposed to be registered. Advantageously the routing status information is comprises routing information towards the IMS and subscriber's or call status information.

Information about the MSISDN numbers that are subscribed in IMS domains as well as routing information to said IMS domains are stored in a database connected to Subscriber Locator and Rerouting function (SLRF). Hence, before sending the SRI Ack message Subscriber Locator and Rerouting function (SLRF) performs a data base inquiry in order to obtain routing information that concerns the location network of the called party and status information.

Thus, the SRI Ack message preferably contains routing and status information RSI and the original E.164 number of the called party.

Upon receipt the SRI Ack message GMSC checks RSI included in the message. The RSI or its content is a sign to the GMSC that the call shall be routed to the PS domain. Routing information is either a part of the RSI or it can be formed based on the RSI. Now the GMSC finds out that the subsequent inquiry has to be sent to the entity revealed in the routing information. In this example routing information refers to the IMS domain.

Thereafter GMSC sends a routing message (IAM) to a PS network element responsible of exchanging signaling with CS domain, in this example MGCF. This is shown as phase 4 in FIG. 2. Routing and status information RSI might identify directly the MGCF to which the routing message shall be sent. Preferably the IAM message comprises both the E.164 number of the called subscriber and RSI sent with SRI_ack message in phase 3. It might of course be possible than it is enough to send the E.164 number only if the MGCF is able to conclude from the origin and the direction of the call that the call is intended to a subscribed identified by the MSISDN number in the message.

Thereafter the call set-up continues in the IMS domain. In case it is found out that the called party has registered to the IMS domain, the call is routed to the mobile terminal of the subscriber located in the IMS domain. What happens in PS network depends on features of the PS network and is out of the scope of this invention. However the call might be returned back to the CS domain, if for example is that the subscriber is currently in CS domain.

It is assumed now, that the called party is currently not in the IMS domain. In this case the call set-up is routed to the CS domain. The MGCF sends an IAM message including to the GMSC, phase 5. This message preferably includes the routing and status information RSI' and the MSISDN number of the called party. If the IAM message comprises routing and status information RSI' it is preferable than the information reflect somehow the status of the call. It is possible than for example the status included in RSI' message has been modified by an element in a PS domain to reflect the fact that the user is currently not in the CS domain. It is of course possible than the IAM message doesn't contain RSI' information. Also this kind of information can be used the GMSC to make conclusion about hoe to rout the call.

It is worth noting that the target GMSC can be just the same node that sent the message in phase 4, but it can be another GMSC as well.

The GMSC has to send a new SRI message inquiring routing information to Subscriber Locator and Rerouting function (SLRF). However, this new message must differ from the SRI message sent previously in phase 2. The GMSC preferably sends the new SRI message including the MSISDN number of the called party and the modified routing and status information (RSI'), phase 6.

The MSISDN numbers are the same but RSI' tells the SLRF that the GMSC has already made one routing inquiry. Based on this finding, the SLRF relays the SRI message to home location register HLR, phase 7. However, prior to relaying the message, the SLRF modifies the content of the message so that the message as a whole conforms to standardized HLR query messages of the GSM system. This means that all extra information that HLR does not understand will be dropped.

An HLR is used here only as an example of an user register. The user register might very well be also any other user register storing information relevant for determining how the rout calls the subscriber. This register might be e.g. Home Subscriber Server (HSS) used in IMS system, if the IMS and CS used common server to store subscriber data.

After the HLR has received the SRI query message, it makes a database query and retrieves the GSM roaming number (MSRN) of the called party. Subsequently the HLR sends a SRI Ack message to the GMSC, phase 8. Based on the MSRN number the call will be routed to the visited MSC where the called party has at that moment registered. It should be noted that events after the HLR has received the SRI message from the SLRF are well known in the art.

DETAILED DESCRIPTION OF THE SECOND EMBODIMENT OF THE INVENTION

The second embodiment of the invention is most relevant in case where the subscriber has different E164 number in CS and PS domains.

FIG. 3 depicts the second embodiment of the invention. Phases 1 and 2 are similar that the phases presented when describing the first embodiment of the invention and there not repeated here.

When the SLRF has received a SRI message from GMSC it responds to GMSC by sending a SRI-Ack message to GMSC, phase 3. However, prior to sending the message the SLRF allocates a new destination identifier e.g. new E.164 number. This new number is preferably a number used by the subscriber in PS network. One possible way of implementing this kind of solution is that the SLRF has a database where the subscriber's CS and PS E.164 numbers are coupled together. Thus by querying the database by CS E.164 number one would get the PS E.164 number and other way round.

The newly allocated number is hereafter denoted as "a new MSISDN number" or "a new E.164 number". Thus, the SRI-Ack message contains routing and status information, which is preferable, the new MSISDN number, phase 3.

Upon receipt the SRI Ack message GMSC checks routing information included in the message. It finds out that the subsequent inquiry has to be sent to the address revealed in the routing information. In this example routing information refers to the entry point of the IMS domain, namely to an element performing media gateway control function MGCF.

Thereafter GMSC sends a routing message (IAM) to the MGCF, phase 4. This message includes the new MSISDN number. What happens next depends on features of the IMS domain and is out of the scope of this invention. However, it is assumed now, that the called party is not at the moment present in the IMS domain.

Therefore, the MGCF of the IMS domain responds to the GMSC of the CS domain preferably with an IAM message including the new MSISDN number of the called party, phase 5. It is worth noting that the target GMSC can be just the same node that sent the message in phase 4, but it can be another GMSC as well.

Now, upon receipt the message from the IMS domain the GMSC knows that the called party has not presented in IMS domain in order to use its services. Therefore, the called party has very likely subscribed to CS domain. The GMSC has to send a new SRI message inquiring routing information to Subscriber Locator and Rerouting function (SLRF). This new message differs from the SRI message sent previously in phase 2 pursuant to the different MSISDN numbers. If the message content were exactly the same as the content of the previous message, the SLRF would respond with the same message as in phase 3, routing information of the message pointing again towards the IMS domain. This is avoided by using the new MSISDN number in the query message.

The GMSC sends, using MAP protocol, a new SRI message to Subscriber Locator and Rerouting function (SLRF), phase 6. The SLRF translates the new MSISDN number to the original one used in the CS domain and detects that one inquiry has already made earlier. Based on this finding, the SLRF relays the SRI message to home location register HLR, phase 7. However, prior to relaying the message, the SLRF modifies the content of the message so that the message as a whole conforms to standardized HLR query messages of the GSM system or any other relevant standardized message if another user register like HSS in queried. Especially, it replaces the new MSISDN number with the original MSISDN number of the called party. All extra information that the user register does not understand is preferably dropped.

After the user register has received the SRI query message, it makes a database query and retrieves the GSM roaming number (MSRN) of the called party. Subsequently the HLR sends a SRI Ack message to the GMSC, phase 8.

Based on the MSRN number the call will be routed to the visited MSC where the called party has at that moment registered, phase 9. It should be noted that events after the HLR has received the SRI message from the MNP-SRF are well known in the art.

The proposed solution described above gives a possibility to provide the PS preferred solution for an IMS subscriber which has ported from a CS domain to an IMS domain, and also gives possibility to reach the subscriber in the CS domain as a roaming subscriber. A great advantage is that the current functionality of the user register like HLR remains untouched. It should be noted that the Subscriber Locator and Rerouting functionality can be implemented as a standalone functionality or it can implemented as a part of the existing functionality, e.g. MNP-SRF.

What is claimed is:

1. A method of routing a call from a circuit switched telecommunications network to a packet switched telecommunications network, wherein the circuit switched telecommunications network is provided with an access to a user register, comprising the steps of:
   sending from a first network element of the circuit switched telecommunications network a first routing information query to an second network element, said query including a destination identifier of a called party,
   sending a response message to the first network element, said response message comprising routing information to the packet switched telecommunications network,
   sending from the first network element, according the routing information, a set-up message to the packet switched telecommunications network, said set-up message comprising the destination identifier of the called party,
   and when the call has been returned from the packet switched telecommunications network back to the circuit switched telecommunications network:
   sending from the first network element a second routing information query to the second network element,
   sending in response to the second routing information query a query message to the user register.

2. The method as in claim 1, wherein the second element is an element performing subscriber locator routing function.

3. The method as in claim 1, further comprising the step of: including to the second routing information query the destination identifier of the called party.

4. The method as in claim 1, further comprising the step of: including to the second routing information query a second identifier in order to differentiate the first information query message and the second information query message.

5. The method as in claim 4, further comprising the step of: including in the packet switched network side the second identifier to the message returning the call from the packet switched network to the circuit switched network.

6. The method as in claim 1, further comprising the step of: forming the query message to the user register as a standard query message according to circuit switched telecommunications network.

7. The method as in claim 1, further comprising the step of: including into said query message the first identifier of the called party.

8. The method as in claim 1, further comprising the step of: returning the call from packet switched network to a different first network element than the one sending the set up message to the packet switched network.

9. The method as in claim 1, further comprising the step of: sending from the user register to the first network element routing information for routing the call to the called party.

10. The method as in claim 1, wherein the destination identifier is an E.164 number.

11. The method as in claim 1, wherein the first network element is a gateway mobile switching center of a mobile telecommunications network.

12. The method as in claim 1, wherein the user register is a home location register of a mobile telecommunications network.

13. The method as in claim 1, wherein the packet switched telecommunications network is an Internet multimedia subsystem.

14. A method for routing a call from a circuit switched telecommunications network to a packet switched telecommunications network, wherein the circuit switched telecommunications network is provided with an access to an user register, comprising the steps of:
   sending from a first network element a first routing information query to a second network element, said query including the destination identifier of a called party,
   allocating a new destination identifier to the call,
   sending a response message to the first network element, said response message comprising routing information to the packet switched telecommunications network,
   sending from the first network element, according the routing information, a set-up message to the packet switched telecommunications network, said set-up message including the new destination identifier of the called party,
   and when the call has been returned from the packet switched telecommunications network back to the circuit switched telecommunications network:
   sending from the first network element a second routing information query to the second network element,
   sending in response to the second routing information query a query message to the user register.

15. The method as in claim 14, wherein the second element is an element performing subscriber locator routing function.

16. The method as in claim 14, further comprising the step of: including to the second routing information query the new destination identifier of the called party.

17. The method as in claim 14, further comprising the step of: forming the query message to the user register as a standard query message according circuit switched telecommunications network.

18. The method as in claim 17, further comprising the step of: including into said query message the first identifier of the called party.

19. The method as in claim 14, further comprising the step of: returning the call from packet switched network to a different first network element than the one sending the set up message to the packet switched network.

20. The method as in claim 14, further comprising the step of: sending from the user register to the first network element routing information for routing the call to the called party.

21. The method as in claim 14, wherein the destination identifier is an E.164 number.

22. The method as in claim 14, wherein the first network element is a gateway mobile switching center of a mobile telecommunications network.

23. The method as in claim 14, wherein the user register is a home location register of a mobile telecommunications network.

24. The method as in claim 14, wherein the packet switched telecommunications network is an Internet multimedia subsystem.

25. A network element for receiving routing information queries from and sending responses to a first network element in a circuit switched telecommunications network,
  said network element having a signaling connection with a user register and, said network element comprising:
  means for receiving a first routing information query from the first network element, said query including a destination identifier of a called party,
  means for forming and sending a response to the first routing information query, to the first network element, the response comprising routing information to a packet switched telecommunications network,
  means for receiving a second routing information query relating to the called party from the first network element, and
  means for forming a query message for sending to the user register in response to the second routing information query.

26. A network element as in claim 25, further comprising:
  means for allocating, in response to the first routing inquiry, a new destination identifier and
  means for including the new destination identifier to the routing information sent to the first network element.

27. A network element as in claim 25, further comprising: means for including the destination identifier to the query message sent to the user register.

28. A network element for use in a method of routing a call from a circuit switched telecommunications network to a packet switched telecommunications network, wherein the circuit switched telecommunications network is provided with an access to a user register, the network element comprising:
  a transmitter configured to send a first routing information query to an second network element, said query including a destination identifier of a called party,
  a receiver configured to receive a response message, said response message comprising routing information to the packet switched telecommunications network,
  a transmitter configured to send, according the routing information, a set-up message to the packet switched telecommunications network, said set-up message comprising the destination identifier of the called party,
  a transmitter configured to send a second routing information query to the second network element in response to the call having been returned from the packet switched telecommunications network back to the circuit switched telecommunications network.

29. The network element as in claim 28, wherein the network element is a gateway mobile switching center of a mobile telecommunications network.

30. A network element for use in a method for routing a call from a circuit switched telecommunications network to a packet switched telecommunications network, wherein the circuit switched telecommunications network is provided with an access to an user register, the network element comprising:
  a transmitter configured to send a first routing information query to a second network element, said query including the destination identifier of a called party,
  a receiver configured to receive a response message, said response message comprising routing information to the packet switched telecommunications network and a new destination identifier allocated to the call,
  a transmitter configured to send, according the routing information, a set-up message to the packet switched telecommunications network, said set-up message including the new destination identifier of the called party,
  a transmitter configured to send a second routing information query to the second network element in response to the call having been returned from the packet switched telecommunications network back to the circuit switched telecommunications network.

31. The network element as in claim 30, wherein the network element is a gateway mobile switching center of a mobile telecommunications network.

* * * * *